United States Patent [19]

Lapeyre et al.

[11] 3,927,474
[45] Dec. 23, 1975

[54] INTERNALLY GIMBALLED COMPASS

[75] Inventors: James M. Lapeyre, New Orleans, La.; John T. Fowler, Winthrop, Mass.

[73] Assignee: The Laitram Corporation, New Orleans, La.

[22] Filed: Aug. 7, 1973

[21] Appl. No.: 386,303

[52] U.S. Cl. ................................. 33/356; 33/363 K
[51] Int. Cl. ...................... G01c 17/18; G06m 1/272
[58] Field of Search.. 33/355 D, 355 R, 356, 363 R, 33/363 K, 363 L, 363 Q, 310, 313, 319, 352, 316, 317, 346, 364

[56] References Cited
UNITED STATES PATENTS

| | | | |
|---|---|---|---|
| 2,077,849 | 4/1937 | Moller et al. | 33/316 |
| 2,247,288 | 6/1941 | Delsuc | 33/316 |
| 2,292,732 | 8/1942 | Anscott | 33/316 |
| 2,300,685 | 11/1942 | McKay | 33/355 D X |
| 2,446,258 | 8/1948 | Burt | 33/355 D X |
| 2,631,455 | 3/1953 | Wing | 33/319 X |
| 3,349,406 | 10/1967 | Perry et al. | 33/363 K |
| 3,568,328 | 7/1968 | Sharpe | 33/355 D X |
| 3,746,842 | 7/1973 | Fowler | 33/363 K X |

*Primary Examiner*—Richard E. Aegerter
*Assistant Examiner*—John W. Shepperd
*Attorney, Agent, or Firm*—Weingarten, Maxham & Schurgin

[57] ABSTRACT

A magnetic compass in which the compass card and magnet are relatively movable with respect to each other such that only the magnet is gimballed to seek alignment with the earth's magnetic field irrespective of the inclination of the compass card. The compass magnet is rotatably mounted within a gimbal assembly and is operative to become aligned with the axis of the earth's magnetic field to seek the dip angle of the magnetic field while providing a rotational torque to cause rotation of the compass card to its balanced position indicative of compass heading. In alternative implementation, the compass magnet is maintained in substantially horizontal disposition to enhance the restoring torque.

7 Claims, 2 Drawing Figures

INTERNALLY GIMBALLED COMPASS

FIELD OF THE INVENTION

This invention relates to magnetic compasses and more particularly to a compass in which the compass card need not be horizontally stabilized for accurate heading determination.

BACKGROUND OF THE INVENTION

In a magnetic compass, a compass card has one or more magnets affixed thereto, the card and associated magnet being mounted as a unit for rotation about the card axis to permit alignment of the compass magnet with the horizontal component of the earth's magnetic field. The compass card and associated magnet must be maintained in a substantially horizontal disposition in order to provide suitable interaction between the magnet and the horizontal component of the earth's magnetic field, and by which an accurate compass heading is attained. Such horizontal disposition is usually maintained by a gimbal assembly within which the compass structure is supported such that the compass card remains in substantially horizontal orientation even in the presence of external motion such as the rolling and pitching of a vessel aboard which the compass is employed. The gimbal assembly is external to the compass and consequently adds to the size and weight of the overall structure. Moreover, in remote reading compasses wherein a coded compass card is optically or otherwise sensed to provide an output signal indication of compass heading, electrical connection to the compass can be cumbersome since flexible wiring must be provided to the compass moveably supported within the gimbals.

SUMMARY OF THE INVENTION

In accordance with the present invention, a magnetic compass is provided in which the compass and magnet are relatively moveable with respect to each other such that only the magnet is gimballed to seek alignment with the earth's magnetic field irrespective of the inclination of the card. The compass magnet is rotatably mounted within a gimbal assembly, the magnet and card being arranged to rotate as a unit about the card axis, but the magnet being independently rotatable about axes transverse to the card axis thereby to permit alignment of the magnetic axis with the axis of the earth's magnetic field.

The compass magnet in the present invention seeks the actual dip angle of the magnetic field rather than the horizontal component thereof as in conventional compasses. As a result, proper interaction between the magnetic field of the earth and the compass magnet is achieved to provide correct compass headings even though the compass card is inclined from a horizontal disposition. The independent gimballing of the compass magnet can be accomplished by a gimbal assembly much smaller than the gimbal assembly required to support an entire conventional compass structure and thus the invention serves to provide a compass which can be of extremely small size.

Since only the compass magnet is gimballed, rather than the entire compass structure, wiring to the card of a remote reading compass is simplified and can be effected by fixed interconnections. In an alternative embodiment, the invention employs a compass magnet counterweighted to maintain the magnetic axis in horizontal disposition in order to enhance the restoring torque urging the magnet to its northerly rest position.

DESCRIPTION OF THE DRAWING

The invention will be more fully understood from the following detailed description taken in conjunction with the accompanying drawing, in which.

DETAILED DESCRIPTION OF THE INVENTION

Figure 1:
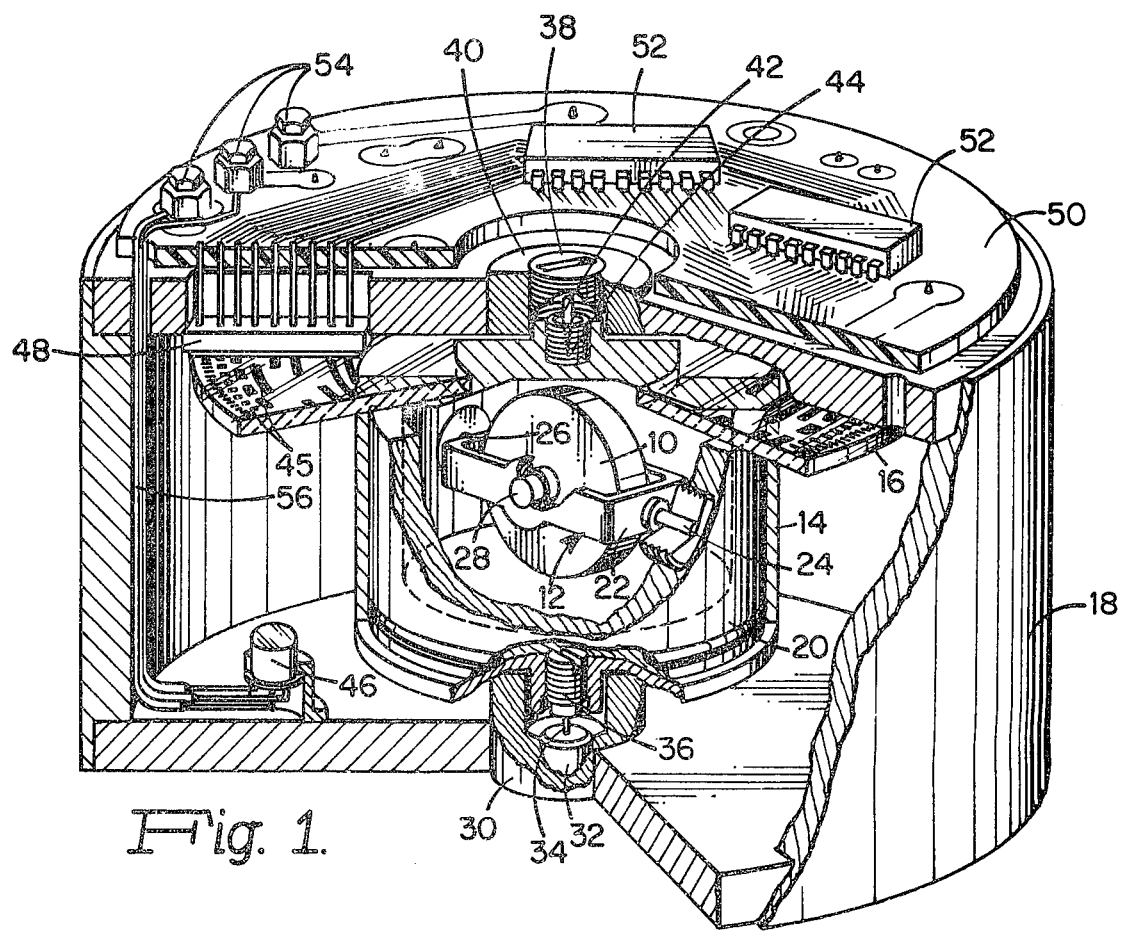
FIG. 1 is a partly cutaway pictorial view of a magnetic compass according to the invention.

A magnetic compass constructed and operative according to the invention is illustrated in preferred implementation in FIG. 1 and includes a magnet 10 supported for rotation by a gimbal assembly 12 disposed within a housing 14 which is affixed to and rotatable with a compass card 16. An enclosure 18 contains the compass structure and is adapted for mounting on a vessel or other body in which the compass is to be employed.

The compass magnet 10 has a magnetic axis in alignment with the north-south axis of card 16. Preferably the magnet is of cylindrical configuration to concentrate the mass of the rotatable compass structure near the center of rotation about the axis of card 16 to thereby minimize the torque necessary to cause card rotation and to thus enhance compass sensitivity. In alternative embodiment, other magnet configurations can be employed such as one or more bar magnets arranged for balanced rotation about the axis of card 16.

Gimbal assembly 12 includes a generally cup-shaped member 20 disposed within housing 14 and supporting a gimbal 22 for rotation about an axis defined by mounting pins 24 and 26. Magnet 10 is supported for rotation within gimbal 22 by means of a shaft 28 to which the magnet is attached and by which the magnet is journalled to gimbal 22 for rotation about the axis of shaft 28. Thus, magnet 10 is free to rotate about the axis of its mounting shaft 28, and is also free to rotate about the orthogonal axis defined by pins 24 and 26. The housing 14 and associated card 16 are mounted by means of bearings for rotation about the axis of card 16 with which the bearings are aligned.

The lower bearing includes a cup-shaped member 30 affixed to the bottom portion of enclosure 18 and in which is mounted a post 32 supporting a pin 34 which is cooperative with a recess in a set screw 36 which, in turn, is mounted to housing 14 at the bottom portion thereof. The upper bearing is similar and includes a post 38 supported by a fitting 40 attached to enclosure 18, the post having a pin 42 cooperative with a recess provided in set screw 44 affixed to the upper portion of housing 14. The bearing surfaces can be jewelled in well known manner to minimize the frictional forces affecting rotation. The bearings can be adjusted for proper support of the rotatable compass structure by threadable adjustment of the set screws in their respective openings. The compass card 16 and associated housing 14 is thus arranged for rotation about the card axis defined by the bearings to seek compass headings as determined by alignment of magnet 10 with the earth's magnetic field.

The compass card or disc 16 has indicia thereon representative of compass headings and such indicia can be in visual or non-visual form. For visual indication of compass headings, card 16 can have provided around the periphery of a surface thereof compass rose or other markings of the compass degree headings. For non-visual indication, card 16 can have a plurality of sensible codes thereon representative of compass headings.

In the illustrated embodiment the compass card is formed of a light transmissive material, such as plastic or glass, having on the top surface thereof a plurality of concentric tracks 45 each having a different predetermined number of alternately light transmissive and opaque segments. Each track is coded to represent one bit of a multiple bit code, the number of tracks being selected to provide intended compass resolution. Nine concentric tracks are employed in the embodiment shown to provide nine bit codes representing degree headings to a resolution of 1°. The coded disc itself is well known in the optical angle encoder art and need not be described at length herein. Such a code disc is employed in a remote reading compass described in copending application Ser. No. 284,362, entitled MAGNETIC COMPASS HAVING REMOTE DIGITAL READOUT, and assigned to the assignee of the present invention.

An illumination source 46, such as a light emitting diode, is supported on the bottom wall of enclosure 18 in a position to direct light through the coded tracks 45 of card 16. Light transmitted through the coded tracks is sensed by an array of photodetectors 48 disposed on the side of card 16 opposite to illumination source 46. The array 48 typically includes a linear array of photocells arranged radially in alignment with card 16 with each photocell in light receiving relationship with a respective coded track 45 and each operative to provide a respective electrical output signal of a first value in response to light received from a transmissive portion of the associated code track and of a second value in response to the absence of light received from an occluded portion of the associated track. Thus, array 48 produces a plurality of digital signals representative of compass heading as determined by the angular disposition of card 16 with respect to array 48.

The photodetector array is mounted on a circuit board 50 supported, for example, on the top surface of enclosure 18. Circuit board 50 typically includes associated electronic circuitry 52 for amplifying the signals provided by array 48 and for subsequent processing of such signals for application to a compass display or other utilization apparatus. The circuit board typically is of printed circuit form with the associated electronic circuitry thereon being in the form of one or more integrated circuit modules and associated components. Electrical connection is made to the compass electronics by means of interconnecting wires connected to terminal posts 54 provided on circuit board 50 and by which power is supplied to the light source and electronic circuitry and output signals coupled to utilization means. Energizing power is provided from board 50 to illumination source 46 such as by wiring 56.

The compass is fabricated of suitable non-magnetic materials such as a plastic for housing 14 and enclosure 18, and brass for the gimbal assembly and associated bearings.

Considering the operation of the invention in a typical environment aboard a marine vessel such as a ship or buoy, the compass enclosure 18 is installed at a suitable position aboard the vessel with the array 48 aligned with or parallel to the steering axis of the vessel.

The magnet 10 will seek alignment with the earth's magnetic field causing rotation of card 16 to a rotationally balanced position which is the measured compass heading. Such heading is sensed by array 48 to provide an electrical output indication thereof which may be employed in utilization apparatus proximate to the compass or which can be remote therefrom. The electrical output signals can be applied to remote utilization apparatus by a suitable communication path which may be either wired or wireless, as the situation requires.

According to the invention, magnet 10 is free to seek the actual dip angle of the earth's magnetic field rather than the horizontal component thereof as in conventional compasses. Thus, the magnet can become correctly aligned with the earth's magnetic field irrespective of the inclined disposition of card 16 which can be occassioned by rolling and pitching motions of the vessel aboard which the compass is installed. The compass is subject to so-called universal joint error by reason of the separately rotatable card axis and gimbal axes, however, such error is minimal for small angles of tilt of the compass card from the horizontal. This error is proportional to the cosine of the tilt angle and by way of example the heading error for a 10° and a 20° tilt angle is 0.6° and 2.7°, respectively. In many circumstances, rolling of a vessel rarely exceeds 20° and the error is within a tolerable range.

Figure 2:
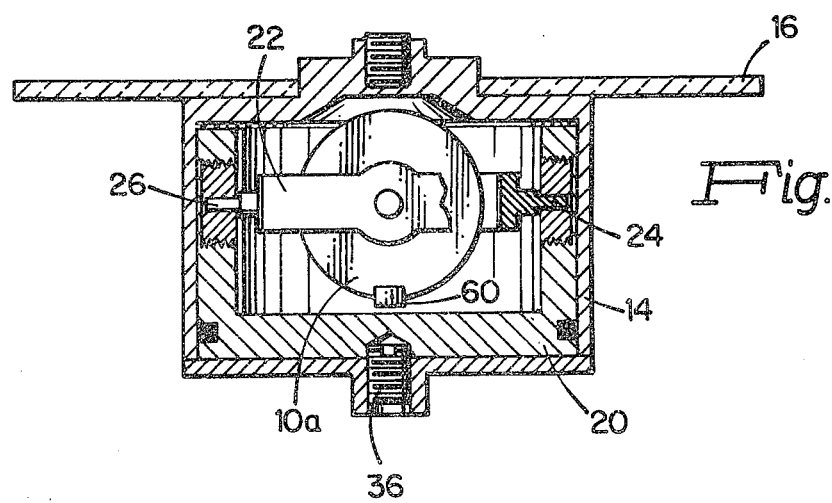
FIG. 2 is a cutaway pictorial view of an alternative embodiment of the invention.

The restoring torque or force on the compass magnet is less for the magnet of the present invention which seeks the dip angle of the earth's magnet field, in contrast to the restoring torque on a horizontally disposed compass magnet. For those instances where greater restoring torque is desirable, the invention can be alternatively embodied as shown in FIG. 2 wherein a counterweight is affixed to the compass magnet to maintain the magnetic axis in a substantially horizontal disposition. Referring to FIG. 2, magnet 10a has its magnetic axis disposed parallel to the plane of compass card 16. A weight 60 is provided at the lowermost portion of magnet 10a along an axis which is orthogonal to the magnetic axis of the magnet. In this embodiment, with compass card 16 in a substantially horizontal disposition, magnet 10a is free to become aligned with the horizontal component of the earth's magnetic field to provide an output indication of compass heading. The magnet tends to remain with its axis horizontally disposed even in the presence of rolling and pitching motions by the pendulous action of counterweight 60.

It will be appreciated that various modifications and alternative implementations of the invention can be provided without departing from the spirit and true scope thereof. Accordingly, it is not intended to limit the invention by what has been particularly shown and described except as indicated in the appended claims.

What is claimed is:

1. A magnetic compass comprising:
   a first housing;
   a compass card having indicia on a surface thereof representative of compass heading;
   a second housing affixed to said compass card and rotatably mounted in said first housing for rotation about the axis of said compass card;
   at least one magnet coupled to said compass card and having a magnetic axis orthogonal to one rotational axis thereof; and
   a gimbal assembly supported within said second housing and operative to suport said at least one magnet for independent rotation throughout 360° about orthogonal axes transverse to the axis of said compass card.

2. A magnetic compass according to claim 1 wherein said at least one magnet includes counterweight means affixed thereto and operative to maintain the magnetic axis thereof in substantially horizontal disposition during normal operation.

3. A magnetic compass according to claim 1 wherein said gimbal assembly includes
    a support frame having first and second mounting pins supported by said second housing and defining a first transverse axis about which said at least one magnet is moveable; and
    third and fourth support pins affixed to said frame and supporting said at least one magnet within said frame for rotation about a second transverse axis defined by said third and fourth pins, said second axis being orthogonal to said first axis.

4. A magnetic compass according to claim 3 wherein said mounting means includes bearing means affixed to said housings and operative to support said compass card and said second housing for rotation about the axis of said card.

5. A magnetic compass comprising:
    a first cylindrical housing having a top and a bottom wall each having centrally disposed bearing support means;
    a second cylindrical housing coaxially disposed inside said first housing and having a top and a bottom wall each having centrally disposed bearing means cooperative with said first housing bearing support means to define upper and lower pivot bearings for pivotal support of said second housing for rotation about the axis of said first housing;
    a cup-shaped member disposed within said second housing;
    a gimbal frame attached to said cup-shaped member for 360° rotation about a first axis orthogonal to said housing axis;
    a cylindrical magnet attached to said gimbal frame for 360° rotation about a second axis orthogonal to said first axis;
    a compass card affixed to the top wall of said second housing for rotation therewith;
    code indicia on said compass card representative of compass headings; and
    code sensing means disposed in operative relation to said indicia and operative to provide electrical output signals in response to sensed indicia indicative of compass heading.

6. A digital compass according to claim 5 wherein said compass card includes;
    an optically sensible disk having a plurality of concentric tracks on a surface thereof each with a different number of alternately light transmissive and opaque segments defining a plurality of multiple bit coded values representative of compass headings; and
    wherein said code sensing means includes;
    a light source in said first housing for transmitting light through the plurality of tracks of said disk;
    a plurality of photosensors in said first housing and each operative to receive light from a respective track of said disk and to produce a corresponding digital signal;
    a circuit board supported on the top wall of said first housing and containing circuitry coupled to said plurality of photosensors and operative to provide in response to said digital signals an output signal representative of compass heading; and
    means for coupling said output signal to utilization means.

7. A magnetic compass according to claim 5 wherein said upper pivot bearing includes;
    a cylindrical fitting mounted in the top wall of said housing and aligned with the axis of said first housing;
    a pivot bearing element mounted in said fitting in alignment with said housing axis and having a downwardly disposed pivot bearing receptacle;
    a post mounted on the top wall of said second housing and aligned with the axis of said first housing and having a pivot bearing pin extending from its upper surface and cooperative with said pivot bearing receptacle to define an upper pivot bearing; and
    wherein said lower pivot bearing includes;
    a second post mounted in the bottom plate of said first housing and aligned with said axis of said first housing and having a second pivot bearing pin extending from its upper surface; and
    a second pivot bearing element mounted in the bottom plate of said second housing and aligned with said axis of said first housing and having a downwardly facing pivot bearing receptacle cooperative with said second pivot bearing pin to define a lower pivot bearing.

* * * * *